H. P. ROBERTS.
BEATING AND MIXING DEVICE.
APPLICATION FILED JUNE 21, 1912.
1,090,567.
Patented Mar. 17, 1914.
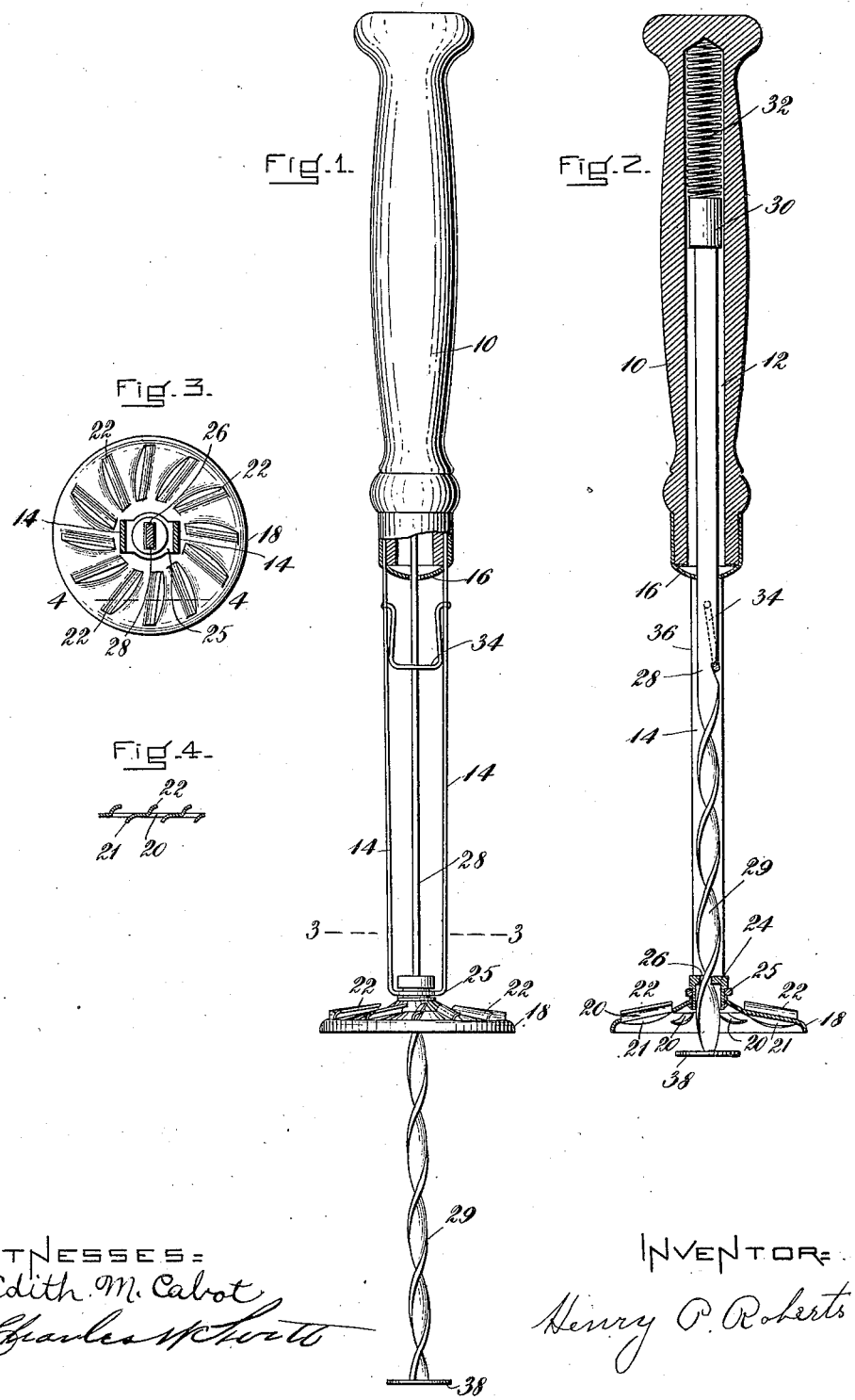

UNITED STATES PATENT OFFICE.

HENRY P. ROBERTS, OF BOSTON, MASSACHUSETTS, ASSIGNOR TO GEORGE R. MOORE AND JOSEPH W. HAWES, OF BOSTON, MASSACHUSETTS.

BEATING AND MIXING DEVICE.

1,090,567.  Specification of Letters Patent.  Patented Mar. 17, 1914.

Application filed June 21, 1912. Serial No. 705,051.

*To all whom it may concern:*

Be it known that I, HENRY P. ROBERTS, of Boston, in the county of Suffolk and State of Massachusetts, have invented certain new and useful Improvements in Beating and Mixing Devices, of which the following is a specification.

This invention relates to an improvement in beating and mixing devices.

The object of the invention is to provide a device which shall quickly and effectively beat up and mix eggs, beverages and the like without spattering, and to produce a thoroughly blended mixture in which all the ingredients are finely divided and thoroughly mixed.

With the above object in view, the invention consists in the beating and mixing device hereinafter described and particularly defined in the claim, the advantages of which will be obvious to those skilled in the art from the following detailed description.

The invention will be clearly understood from an inspection of the accompanying drawing, in which—

Figure 1 is a front elevation of the device in extended position, Fig. 2 is a sectional side elevation of the device contracted, Fig. 3 is a sectional plan view of the dasher, and Fig. 4 is a vertical section taken on the line 4—4 in Fig. 3.

As illustrated in the drawing, the device comprises a hollow handle 10, having a chamber 12, and provided with a dasher support in the form of a U-shaped strap 14 depending from its lower end and affixed thereto by means of a ferrule 16. Rotatably mounted on the lower end of the strap 14 is a dasher 18. The dasher is made of sheet metal concaved downward and provided in its top portion with a series of slots or slits 20, and vanes or blades 21, 22, extending substantially radially. The vanes 21 extend within the upper portion of the dasher, and the vanes 22 extend upward and outward from said upper portion. The vanes are curved somewhat transversely, so that when the dasher is given a combined rotary and reciprocatory motion they operate somewhat in the nature of the lips of an auger to cut the eggs or similar material, and thoroughly beat the same without spattering.

The dasher is affixed at its center to a shouldered collar 24, which is journaled to rotate within the horizontal portion 25 of the strap 14. Said collar is provided in its upper end with a rectangular guiding aperture 26, which is adapted to receive a stem 28 of corresponding cross-section. The lower portion 29 of this stem is spiral, while the upper portion is straight and provided at its upper end with a head or knob 30 adapted to slidably fit the interior of the chamber 12 in the handle 10. A coiled spring 32 is held within the chamber 12 and bears against the upper end of the head 30. This spring tends normally to keep the handle in raised position, or the stem in extended position, as shown in Fig. 1. A plate or base 38 is affixed to the lower end of the stem 28 and is adapted to rest on the bottom of the receptacle (not shown) in which the eggs or beverage to be treated may be contained. Said stem may be held in retracted position by means of a catch 34, comprising a bail pivotally mounted in the sides of the strap 14 and adapted to engage a notch 36 provided on the adjacent edge of the stem, as shown in Fig. 2.

To release the stem it is merely necessary to push down the handle 10, thus lowering the strap 14 and with it the catch 34. The latter engages the spiral stem and is pushed outward thereby, so that it can clear the edge of the notch 36 when the handle is moved upward. The catch thereafter remains clear of the notch during the reciprocation of the handle.

The operation of the device is as follows: The handle 10 is grasped by the operator, and the stem 28 is released from the catch 34. The spring 32 will then expand and raise the handle 10 and with it the strap 14 and dasher 18. As the collar 24 travels up or down the spiral 29 it is rotated, and with it the dasher 18 is rotated and reciprocated. When the handle 10 is lowered to compress the spring 32, the strap 14 carries the collar and the dasher downward, and the former passing over the spiral is caused to rotate, and with it the dasher is rotated. Thus it will be observed that the dasher is given a reciprocatory and whirling motion, and the oppositely inclined blades or vanes 21, 22 are given a spiral motion to cut and mix the ingredients of the receptacle, without causing them to spatter. The slits 20 allow the material to pass back and forth through the dasher so that it is thoroughly cut up, mixed and aerated, and rendered uniform and smooth in texture. After the beating and mixing operation is completed, the handle 10 is forced down to enable the bail 34 to be pushed manually into the notch 36, as shown in Fig. 2. Then the device is removed from the receptacle and any liquid remaining on the parts is removed by shaking the dasher and gently striking the strap 14 across the edge of he receptacle.

What I claim is:

An article of the character described, comprising a handle, a support depending from said handle, a dasher rotatably mounted on said support, a spiral stem passing through said dasher, a spring within said handle tending normally to force said stem out of the latter, said stem being arranged to rotate said dasher when the former is reciprocated therethrough, and a catch arranged to hold said stem in retracted position.

In testimony whereof I have affixed my signature, in presence of two witnesses.

HENRY P. ROBERTS.

Witnesses:
CHARLES W. SWETT,
CHARLES F. HOWE.

Copies of this patent may be obtained for five cents each, by addressing the "Commissioner of Patents, Washington, D. C."